United States Patent
Bhan

(10) Patent No.: US 12,333,580 B2
(45) Date of Patent: Jun. 17, 2025

(54) METHOD AND SYSTEM OF SENTIMENT-BASED TOKENIZATION AND SECURE DEPLOYMENT THEREOF

(71) Applicant: HIWAVE TECHNOLOGIES INC., Toronto (CA)

(72) Inventor: Vaibhav Bhan, Toronto (CV)

( * ) Notice: Subject to any disclaimer, the term of this patent is extended or adjusted under 35 U.S.C. 154(b) by 0 days.

(21) Appl. No.: 18/207,866

(22) Filed: Jun. 9, 2023

(65) Prior Publication Data

US 2023/0342822 A1  Oct. 26, 2023

Related U.S. Application Data

(63) Continuation-in-part of application No. 18/107,714, filed on Feb. 9, 2023, now Pat. No. 12,236,451, which is a continuation-in-part of application No. 17/204,324, filed on Mar. 17, 2021, now Pat. No. 11,605,004, which is a continuation-in-part of application No. 16/216,038, filed on Dec. 11, 2018, now Pat. No. 11,030,533.

(51) Int. Cl.
G06F 40/35       (2020.01)
G06F 40/289      (2020.01)
G06Q 30/0282     (2023.01)

(52) U.S. Cl.
CPC ....... G06Q 30/0282 (2013.01); G06F 40/289 (2020.01); *G06Q 2220/00* (2013.01)

(58) Field of Classification Search
CPC ........ G06F 16/13; G06F 16/24; G06F 16/156; G06F 40/35; G06F 40/20; G06N 3/00; G06N 5/00; G05B 13/00
See application file for complete search history.

(56) References Cited

U.S. PATENT DOCUMENTS

| | | | |
|---|---|---|---|
| 8,554,701 B1 * | 10/2013 | Dillard | G06F 40/30 706/12 |
| 10,311,069 B2 * | 6/2019 | Allen | G06F 16/337 |
| 12,003,814 B2 * | 6/2024 | Smith | H04N 21/44218 |
| 2013/0103386 A1 * | 4/2013 | Zhang | G06F 40/30 704/9 |
| 2015/0242393 A1 * | 8/2015 | Zaragoza | G06F 40/10 704/9 |
| 2017/0308523 A1 * | 10/2017 | Wang | G06F 40/232 |
| 2017/0315996 A1 * | 11/2017 | Fothergill | G06F 16/951 |
| 2017/0351676 A1 * | 12/2017 | Allen | G06F 16/9535 |
| 2018/0089168 A1 * | 3/2018 | Arquero | G06F 40/151 |
| 2018/0113863 A1 * | 4/2018 | Kuznetsov | G06F 16/435 |
| 2018/0226071 A1 * | 8/2018 | Winter | G10L 15/063 |
| 2019/0073413 A1 * | 3/2019 | Kim | G06Q 40/04 |
| 2019/0095535 A1 * | 3/2019 | Miller | G06Q 50/01 |
| 2019/0121842 A1 * | 4/2019 | Catalano | G06F 40/247 |
| 2019/0130463 A1 * | 5/2019 | Bolla | G06Q 30/0607 |
| 2019/0171660 A1 * | 6/2019 | Kershaw | G06F 40/30 |
| 2019/0243925 A1 * | 8/2019 | Baughman | G06F 16/3334 |

(Continued)

*Primary Examiner* — Hung D Le

(57) ABSTRACT

Method and system of generating and deploying a tokenized digital asset. The method includes monitoring generation of a sentiment expression in accordance with social media content data, the sentiment expression rendered in association with a sentiment community of interest, generating a sentiment block digital asset in accordance with the sentiment expression and rendering, as a tokenized digital asset, a digital token data file that is a unique representation of the sentiment block digital asset.

20 Claims, 11 Drawing Sheets

(56) References Cited

U.S. PATENT DOCUMENTS

| | | | | |
|---|---|---|---|---|
| 2019/0349321 A1* | 11/2019 | Cai | ........................ | G06N 3/006 |
| 2020/0104417 A1* | 4/2020 | Fox | ........................ | G06F 16/951 |
| 2020/0133238 A1* | 4/2020 | Geiselhart | ............... | G06F 40/30 |
| 2020/0167418 A1* | 5/2020 | He | ........................ | G06N 20/20 |
| 2020/0184017 A1* | 6/2020 | Batra | ...................... | G06F 16/95 |
| 2020/0279279 A1* | 9/2020 | Chaudhuri | ............... | G06N 5/04 |
| 2021/0380118 A1* | 12/2021 | Xia | ........................... | G06F 7/08 |
| 2022/0114185 A1* | 4/2022 | Castro | .................. | G06Q 50/186 |
| 2022/0345779 A1* | 10/2022 | Smith | ................ | H04N 21/8547 |
| 2023/0120887 A1* | 4/2023 | Yu | ........................ | G06N 3/045 |
| | | | | 706/25 |
| 2023/0177878 A1* | 6/2023 | Sekar | ...................... | G06F 40/40 |
| | | | | 382/103 |
| 2023/0267144 A1* | 8/2023 | Ozer | .................... | G06Q 20/123 |
| | | | | 382/276 |
| 2023/0274088 A1* | 8/2023 | Peng | ..................... | G06F 40/211 |
| | | | | 704/9 |
| 2024/0104816 A1* | 3/2024 | Shaw | ...................... | A63F 13/58 |

\* cited by examiner

- replace_specific → replace text(from, to)
- remove_whitespace → remove extra white spaces(from)
- remove_RT → remove retweet RT(from)
- intensify_puns → replace punctuations with word equivalent(from)
- replace_emoji_to_word → replace emojis with word equivalent(from)
- remove_URL → remove URLs(from)
- remove_hashtag → either remove # or #WORD(from)
- remove_at_user → either remove @ or @WORD(from)
- strip_non_ascii → remove non-ascii characters(from)
- lemmatize_words → lemmatize words(from)
- remove_pos_tagged → remove all but specified POS tags(from, tags)
- lower → lower all characters(from)
- exp_specific_contra → expand contractions with default/custom dictionary(from, dictionary)
- try_slipcorrect → remove spelling errors(from)
- encode → encode 'unknowns' and other words(from, code)
- numeric_to_word → encode text to string format(from, encoding)
- remove_punctuations → convert numeric to word equivalent(from)
- remove_punctuations → remove punctuations(from)
- remove_non_alphabet → remove all non alpha characters(from)
- remove_specific_sequence → remove specific regex sequence(from, seq)

Text → [401] → Processed Text

500

```
┌─────────────────────────────────────────────┐
│ Receiving data, in a database memory         │
│ associated with a server computing device,   │
│ the data extracted from a plurality of data  │
│ sources                                      │
│                                         510  │
└─────────────────────────────────────────────┘
                      │
                      ▼
┌─────────────────────────────────────────────┐
│ Pre-processing the data, in a processor of   │
│ the server computing device, based on at     │
│ least one of text character removal and text │
│ character replacement, to provide pre-       │
│ processed data that includes a set of        │
│ keywords used in a descriptive manner        │
│                                         520  │
└─────────────────────────────────────────────┘
                      │
                      ▼
┌─────────────────────────────────────────────┐
│ Performing a sentiment analysis on the set   │
│ of keywords based at least in part upon a    │
│ training model, the sentiment analysis       │
│ identifying: (i) a conformance to at least   │
│ one sentiment classification of a set of     │
│ sentiment classifications recognized by the  │
│ training model, and (ii) a sentiment         │
│ intensity rating associated with the         │
│ conformance                             530  │
└─────────────────────────────────────────────┘
                      │
                      ▼
┌─────────────────────────────────────────────┐
│ Modifying the sentiment intensity rating     │
│ associated with the at least one sentiment   │
│ classification upon detecting a sarcasm      │
│ sentiment that is above a sarcasm sentiment  │
│ likelihood threshold                         │
│                                         540  │
└─────────────────────────────────────────────┘
                      │
                      ▼
┌─────────────────────────────────────────────┐
│ Generating the transitory sentiment          │
│ community based at least in part on the at   │
│ least one sentiment classification and the   │
│ modified sentiment intensity rating          │
│                                         550  │
└─────────────────────────────────────────────┘
```

FIG. 5

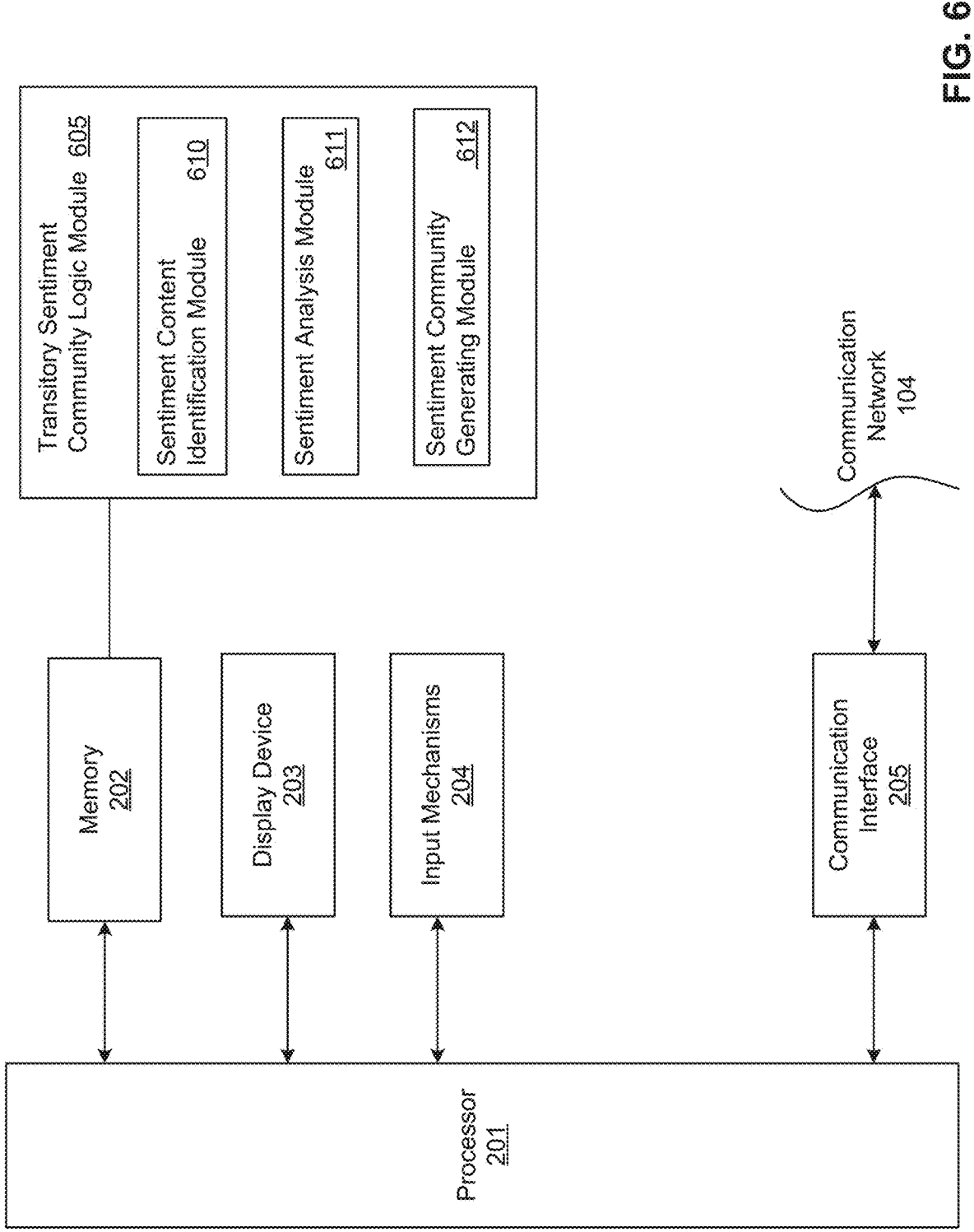

700

Identifying, in accordance with a supervised trained model, within agglomerated social media content data, content associated with a subject of interest and characterized in accordance with one of a sentiment expressive usage and not a sentiment expressive usage, the subject of interest defined in accordance with at least one text character string
710

Performing, based on an unsupervised trained model in conjunction with content associated with the sentiment expressive usage, a sentiment analysis that determines a sentiment intensity rating associated with at least a portion of the agglomerated social media content data
720

Generating the transitory sentiment community based at least in part on the sentiment intensity rating

```
┌─────────────────────────────────────────────────────────────┐
│ Monitoring generation of at least one sentiment expression  │
│ in accordance with social media content data, the at least  │
│ one sentiment expression rendered in association with a     │
│ sentiment community of interest                             │
│                                                             │
│                                                        1110 │
└─────────────────────────────────────────────────────────────┘
                              │
                              ▼
┌─────────────────────────────────────────────────────────────┐
│ Generating a sentiment block digital asset in accordance    │
│ with the at least one sentiment expression                  │
│                                                             │
│                                                        1120 │
└─────────────────────────────────────────────────────────────┘
                              │
                              ▼
┌─────────────────────────────────────────────────────────────┐
│ Rendering, as a tokenized digital asset, a digital token    │
│ data file that is a unique representation of the sentiment  │
│ block digital asset                                         │
│                                                             │
│                                                        1130 │
└─────────────────────────────────────────────────────────────┘
```

FIG. 11

METHOD AND SYSTEM OF SENTIMENT-BASED TOKENIZATION AND SECURE DEPLOYMENT THEREOF

RELATED APPLICATIONS

This application is a continuation-in-part of, and claims benefit of priority to, U.S. patent application Ser. No. 18/107,714 filed Feb. 9, 2023 which in turn claims benefit of priority to U.S. patent application Ser. No. 17/204,324 filed Mar. 17, 2021 now issued as U.S. Pat. No. 11,605,004 which in turn claims benefit of priority to U.S. patent application Ser. No. 16/216,038 filed Dec. 11, 2018 now issued as U.S. Pat. No. 11,030,533; the aforementioned priority application Ser. Nos. 18/107,714, 17/204,324 and 16/216,038 are hereby incorporated in their entirety herein.

TECHNICAL FIELD

The disclosure herein relates to tokenization and deployment of digital assets based on sentiment generation.

BACKGROUND

Current techniques associate social connections of a user that can be used effectively for purposes such as promoting products and services or for making personalized interactions in a system. Such approaches may lack a system that can collect and interpret necessary information without limitations based on literal interpretations of sentiment information as collected, while respecting privacy and intellectual property rights of individuals regarding content as created.

BRIEF DESCRIPTION OF THE DRAWINGS

FIG. 4 illustrates an example embodiment of pre-processing data in generating a transitory sentiment community.

FIG. 5 illustrates, in an example embodiment, a method of operation in generating a transitory sentiment community.

FIG. 6 illustrates, in an example embodiment, an architecture of a computing system for initiating an interface concurrent with generation of a transitory sentiment community.

FIG. 7 illustrates, in an example embodiment, a method of operation for initiating an interface concurrent with generation of a transitory sentiment community.

FIG. 11 illustrates, in an example embodiment, a method of operation in rendering a tokenized digital asset.

DETAILED DESCRIPTION

Figure 1:
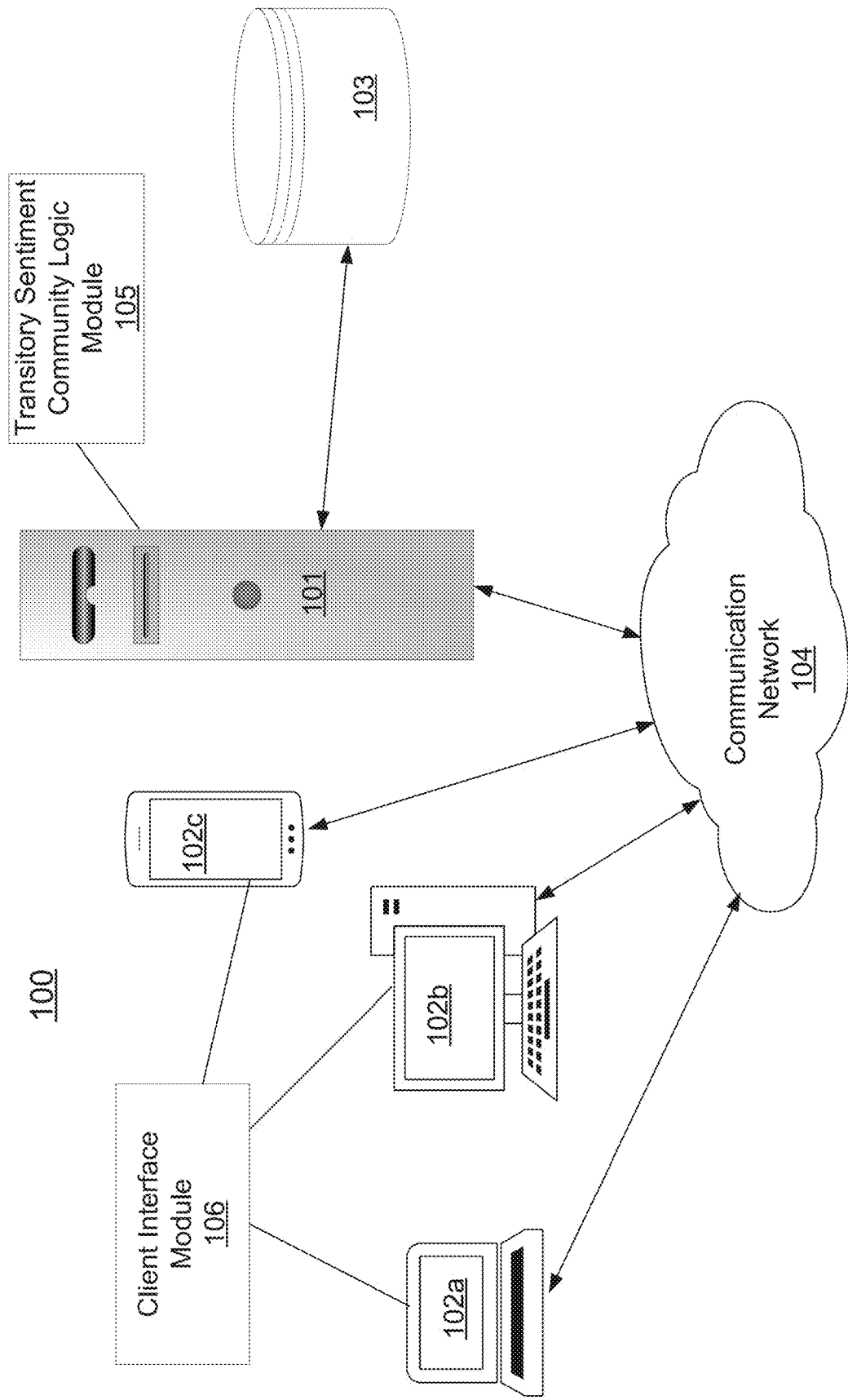
FIG. 1 illustrates, in an example embodiment, a server-based system for generating a transitory sentiment community.

Among other technical advantages and benefits, solutions provided herein provide a system that initiates, concurrent with execution of a software application that generates a transitory sentiment community at a server computing device, an interface at a subscriber computing device. The transitory nature of the sentiment community as generated ebbs and flows, while parallel initiating of a subscriber interface at the subscriber computing device mirrors that ebb and flow. In accordance with such ebb and flow, the sentiment community is created or deleted in accordance with threshold sentiment parameters that define the creating or deleting of the transitory sentiment community. In some embodiments as suited for an ad hoc purpose, the transitory sentiment community may be based on collective sentiment or emotion inferred from posted content using a linguistic framework, allowing for real-time, fluid monitoring of such sentiment community in accordance with its transitory nature, while respecting individual privacy rights associated with content sources.

Embodiments herein further recognize a need for providing users control of third party access and usage over their data content and intellectual property created, the data content configured in embodiments herein by way of sentiment blocks. Some embodiments herein provide for capturing sentiment-based content via sentiment blocks, tokenizing same, and deploying to monetize user or content creator's intellectual property (IP) rights. In some aspects, embodiments herein enable monetizing IP rights over a blockchain infrastructure, also enabling payments directly to users for their engagements via blockchain infrastructure. Also, a long-standing problem of data and ID theft creates significant reputational and financial implications for companies who centralize the collection and storage of user data. Clearly, current solutions of centralized data storage are challenged as both personal and behavioral data significantly increases in volume worldwide. Centralized systems like cloud storage do not mitigate this risk and in fact exacerbates the situation even more as they become prime targets that attract data theft attempts.

In alleviation of the above problems, embodiments herein provide solutions by way of creating a distributed ledger of sentiment-related content created, with engagements for each user on a given network, returning and securing ownership of sentiments, comments, engagement expressed anywhere on the public web to the particular individual creating such expressive content. In particular, solutions provided allows each user to register their social forums, web forums and product or services reviews accounts. Once connected, solutions herein tracks all utterances and interactions of such registered users on the web, and keeps an up to date accounting of sentiment, contexts and mentioned brands, entities in a distributed ledger, the data being stored in distributed nodes across the globe on nodes such as laptops, phones and other handheld and wearable computing devices. This network continuously gathers, processes and indexes engagement, sentiment and quantity of chatter generated by any given user. Embodiments here also enable users to build their online engagement profile and control what content is shared with external buyers looking to utilize the topic commentaries in association with related sentiments.

In accordance with a first example embodiment, a method of generating and deploying a tokenized digital asset is provided. The method comprises monitoring generation of at least one sentiment expression in accordance with social media content data, the sentiment expression rendered in association with a sentiment community of interest, generating a sentiment block digital asset in accordance with the sentiment expression and rendering, as a tokenized digital asset, a digital token data file that is a unique representation of the sentiment block digital asset.

In accordance with a second example embodiment, also provided is a computing system, which may be a networked server computer, or a subscriber client computer deployed in an edge computing networked arrangement, for generating and deploying a tokenized digital asset. The computing system includes a processor and a memory storing instructions executable in the processor. The instructions, when executed in the processor, cause the processor to perform operations including monitoring generation of at least one sentiment expression in accordance with social media content data, the at least one sentiment expression rendered in association with a sentiment community of interest, generating a sentiment block digital asset in accordance with the at least one sentiment expression and rendering, as a tokenized digital asset, a digital token data file that is a unique representation of the sentiment block digital asset.

Also provided is a non-transitory, computer readable memory storing instructions executable in a processor device. The instructions, when executed in the processor device, cause the processor to perform operations including monitoring generation of at least one sentiment expression in accordance with social media content data, the at least one sentiment expression rendered in association with a sentiment community of interest, generating a sentiment block digital asset in accordance with the at least one sentiment expression and rendering, as a tokenized digital asset, a digital token data file that is a unique representation of the sentiment block digital asset.

One or more embodiments described herein provide that methods, techniques, and actions performed by a computing device are performed programmatically, or as a computer-implemented method. Programmatically, as used herein, means through the use of code or computer-executable instructions. These instructions can be stored in one or more non-transitory memory resources of the computing device.

Furthermore, one or more embodiments described herein may be implemented through the use of logic instructions that are executable by one or more processors of a computing device, including a server computing device. These instructions may be carried on a computer-readable medium. In particular, machines shown with embodiments herein include processor(s) and various forms of memory for storing data and instructions. Examples of computer-readable mediums and computer storage mediums include portable memory storage units and flash memory (such as carried on smartphones). A server computing device as described herein utilizes processors, memory, and logic instructions stored in the memory or computer-readable medium. Embodiments described herein may be implemented in the form of computer processor-executable logic instructions or programs stored on computer-readable memory mediums.

System Description

FIG. 1 illustrates, in an example embodiment, transitory sentiment community logic module 105 hosted at server computing device 101, within cloud networked system 100 for software application execution with concurrent signaling. While server computing device 101 may include transitory sentiment community logic module 105 as depicted, it is contemplated that, in alternate embodiments, computing devices 102a-c, including desktop workstations, laptop computers, and mobile computing devices 102a-c in communication via network 104 with server 101, may include one or more sub-modules or portions that constitute transitory sentiment community logic module 105 as embodied in computer processor-executable instructions stored within a non-transitory computer readable memory. Database 103 may be communicatively accessible to server computing device 101 (also referred to as server 101 herein) and also to one or more of client computing devices 102a-c (also collectively referred to herein as client computing device 102) via communication network 104.

Client computing devices 102a-c may be configured to include client interface module 106 constituted of processor-executable instructions, allowing interaction by a user at client computing devices 102a-c with results generated from, or in conjunction with, transitory sentiment community logic module 105 at server 101. In one embodiment, client interface module 106 includes processor-executable instructions or a software application downloadable from server computing device 101 and configured to operate in conjunction with transitory sentiment community logic module 105 to allow physical user interface representations of the sentiment community at client computing device 102. It is contemplated that, in alternate embodiments, client interface module 106 may include one or more sub-modules or portions that constitute transitory sentiment community logic module 105 as embodied in computer processor-executable instructions stored within a non-transitory computer readable memory, and executable in a processor of client device 102.

Figure 2:
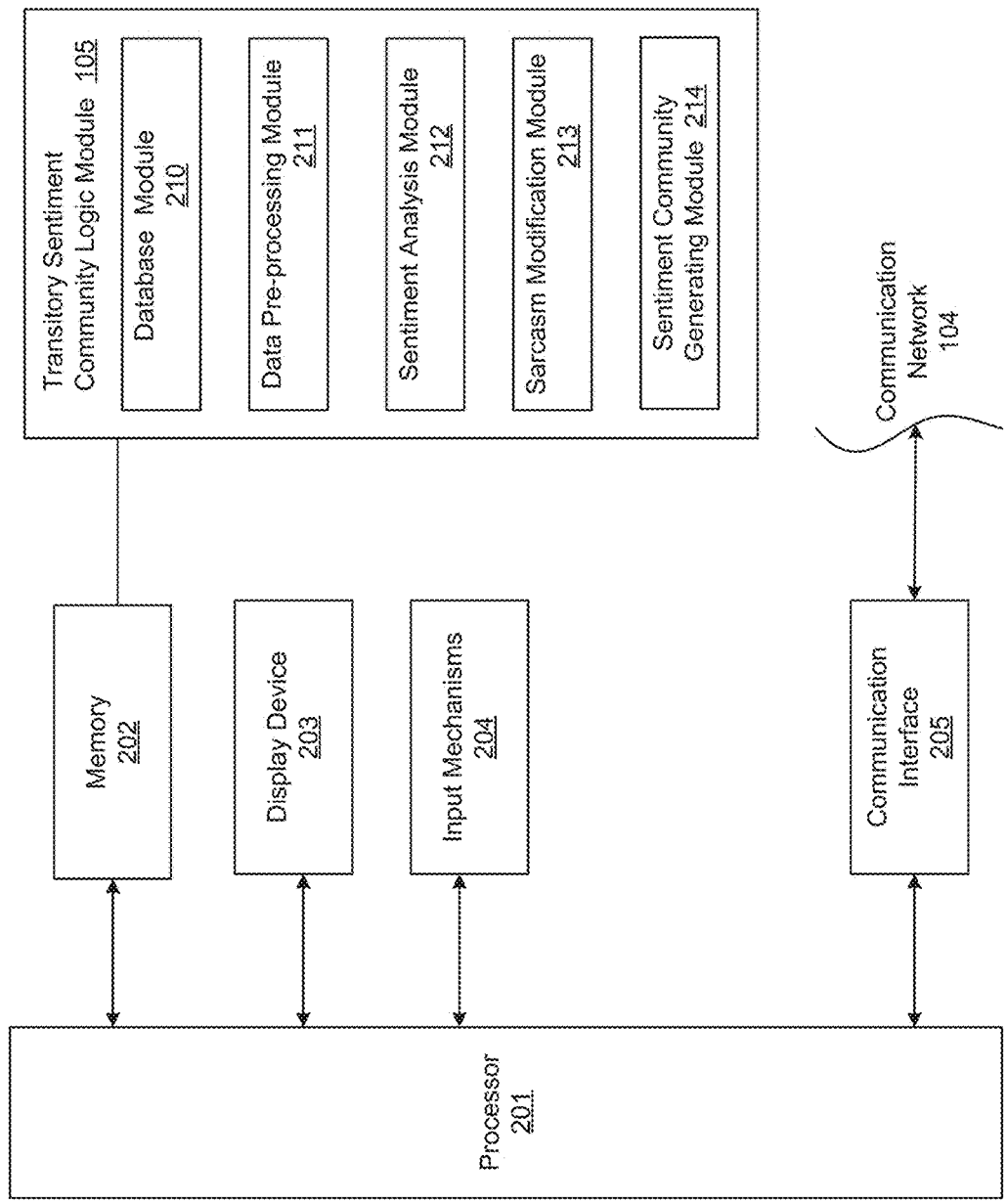
FIG. 2 illustrates, in one example embodiment, an architecture of a computing system for generating a transitory sentiment community.

FIG. 2 illustrates, in an example embodiment, an architecture of server computing device 101 hosting transitory sentiment community logic module 105. Server computing device 101 may include processor 201, non-transitory computer readable memory 202 that includes transitory sentiment community logic module 105, display screen 203, input mechanisms 204 such as a keyboard or software-implemented touchscreen input functionality, and communication interface 207 for communicating with client devices 102a-c via communication network 104.

Transitory sentiment community logic module 105 includes instructions stored in memory 202 of server 101, the instructions configured to be executable in processor 201. Sentiment community logic module 105 may comprise portions or sub-modules including database module 210, data pre-processing module 211, sentiment analysis module 212, sarcasm modification module 213 and sentiment community generating module 214.

Database module 210, in an embodiment, includes instructions executable in processor 201 in association with database module 210 to receive data, in a database memory associated with server computing device 101, the data extracted from a plurality of data or content sources.

Data pre-processing module 211, in an embodiment, includes instructions executable in processor 201 to pre-process the extracted data or content, based on at least one of text character removal and text character replacement, to provide pre-processed data that includes a set of keywords used in a descriptive manner.

Sentiment analysis module 212, in an embodiment, includes instructions executable in processor 201 to perform a sentiment analysis on the set of keywords, based at least in part upon a training model, to: (i) a identify a conformance to at least one sentiment classification of a set of sentiment classifications recognized by the training model, and (ii) derive a sentiment intensity rating associated with the conformance. In some example embodiments, sentiment classifications or labels may represent sentiments or emotions, in addition to a "sarcasm" or "sarcastic" sentiment or emotion, as any one or more of "anger", "disgust", "fear", "joy", "sadness", "surprise", "trust", "anticipation", "distrust", "satisfied", "dissatisfied", "disappointed", "delighted". It is contemplated that descriptions, classifications, labels and representations of sentiments or emotions may not be limited to only the latter examples, and furthermore, need not be limited to any particular form of, or conformance with, particular grammatical forms in accordance with tenses, verbs, nouns, or adjectives.

Sarcasm modification module 213, in one embodiment, includes instructions executable in processor 201 to modify the sentiment intensity rating associated with the at least one sentiment classification of the sentiment classifications recognized by a training model upon detecting a sarcasm sentiment that is above a sarcasm sentiment likelihood threshold. The sarcasm sentiment may be associated with a statistical likelihood that the set of keywords pertain to sarcasm based in art on the author of the underlying content. In one embodiment the sarcasm sentiment likelihood threshold may be expressed as a statistical confidence level threshold value, above which threshold value a sarcasm sentiment is established as detected.

Sentiment community generating module 214, in one embodiment, includes instructions executable in processor 201 to generate the transitory sentiment community based at least in part on the sentiment classification and the modified sentiment intensity rating in accordance with applying sarcasm sentiment module 213.

Figure 3:
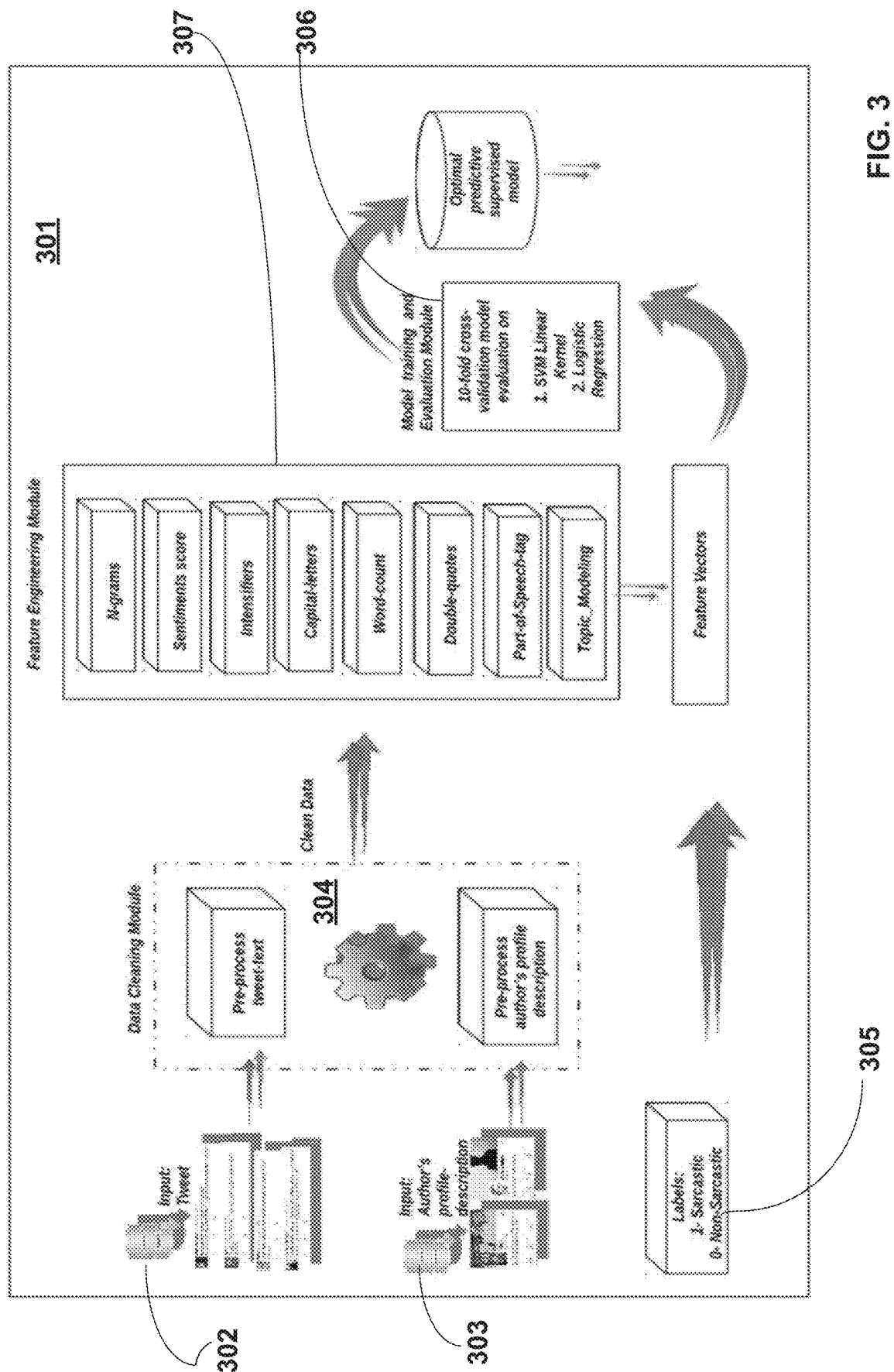
FIG. 3 illustrates, in an example embodiment, a linguistic framework including a sarcasm sentiment module.

FIG. 3 illustrates, in an example embodiment, linguistic framework 301 that includes author profile component 303, pre-processing component 304 which includes author profile pre-processing functions, and sarcasm identification component 305 of sarcasm sentiment module 213 for modifying a sentiment intensity rating associated with an identified sentiment class. The identified sentiment class may be one, or more than one in alternate embodiments, of a set of sentiment or emotion classifications recognized by training model 306.

Data source input component 302 provides input data to database module 210 to receive data in memory 202 or a database memory 103 associated with server computing device 101, the data being extracted from a plurality of data sources. The data sources comprise publicly available data such as, but not limited to, tweet content, instant messaging content, product review content, service review content, social media posting content, and website content.

Data gathered from content sources may be stored, in an OrientDB open source NoSQL graph database in one embodiment, allowing flexibility, scalability, rapid scaling of data, providing advantages in query optimization, including use of lightweight edges and indexes that improves the speed of data retrieval. Data objects may be stored as nodes, with corresponding relationships represented as edges. Each node has unique properties depending on the source, but most nodes share common properties including user ID, create date, text, source, sentiment, category, and emotion parameters. Edges that connect the nodes show the relationship between nodes. Some edges have their own properties (regular edges) while others do not (lightweight edges).

General database optimization and tuning techniques may be applied to further improve database performance, such as indexing techniques applied to ensure advantageous balance between quick database access and disk space, with lightweight edges incorporated to improve performance and memory usage.

Feature engineering component 307 of linguistic framework 301 provides features and operations to be applied upon pre-processed, or cleaned, data of data cleaning module 304.

FIG. 4 illustrates an example embodiment 401 in exemplary detail related to pre-processing data in generating a transitory sentiment community, showing pre-processing operations performed on content, including text removal and text replacement operations.

In an embodiment that implements topic extraction operations, a topic model based on dirilecht distributions and multinomial may be used to provide classification and general understanding of latent topics within the data content, such as a review of a product or service. In an embodiment, prior knowledge of topic-word distribution may be sued to provide an initialization to the starter distributions when selecting topic per word and to the data content item as well. This process of initializing the likelihood based on prior words may be incorporated into an online dirilecht-based technique. Creating the prior knowledge of topic-word distribution may be done manually for each use case to provide custom priors and allow for a guided latent Dirichlet allocation (LDA) approach which specializes in learning topics for a specific domain. To further improve and to be able to re-incorporate the priors we allow for constant reminder of prior information to stay within the model through the alpha and beta parameters of the LDA model. These two parameters in the online LDA algorithm allow the priors to maintain relevant throughout the inference and training processes. To calculate an optimal alpha beta contribution factor of regression analysis may be used to calculate alpha and beta parameters separated by combinations of prior knowledge and a set of coefficients.

Topic relevance ranking may be incorporated rank the words which describe each latent topic. An after-training analysis of the model and come with up relevancy and saliency scoring metrics. Adoption of these metrics allows for ranking of topic words, topic separation, and topic dominance. Attaching the new relevance metrics to online LDA with priors provide a unique and enhanced tool for topic analysis with quality measures. For topic optimization, topic modeling methods generate multinomial topic distribution in which each topic is a set of uni-gram tokens with a probability that determines how frequent each word appears in a text. In order to have more understandable topics, uni-gram tokens may be replaced with high quality phrases.

In one embodiment, a set of candidate labels may be extracted from the reference corpus. Then a relevancy score assigned to each candidate label. To score candidate labels, Kullback-Leibler divergence may be applied to find similarity between distribution of words in a topic and distribution of words in a label. Candidate labels may be ranked with respect to each topic model and top ranked labels selected to label the corresponding topic(s), a good label being denoted as having high semantic relevance to the target topic, and low semantic relevance to other topics.

Next in regard to topic related sentiment or emotion analysis, a pre-trained model 306 may be used to capture char embeddings is a new tactic in linguistic-based models. To further the model to high accuracies, a specialized set of keywords may be identified and applied to gather training data for each of a set of emotions or sentiments. Using the list of keywords for each emotion training data may be extracted from content sources. The data was cleaned prior to training to ensure the keywords were used in a descriptive manner. Additionally, trained models may be incorporated to implement a full artificial intelligence (AI)-based teacher-student model. Such AI teachers may be implemented to select training data with high degree of confidence to be used to further train the emotion or sentiment model. To generate meaningful phrases as candidate labels from reference collection, chunking parser methods may be used to extract noun phrases. Labels which contain more important words (higher probability) in the topic distributions are considered as good labels. Multinomial distribution of topics found with online LDA (with setting priors as guided LDA) may be then matched with the top-ranked candidate labels which have high relevance score to each individual topic.

Next with regard to the particular sentiment of sarcasm, sentiment-based models may fail when sarcasm is involved in the input data content, for example, in tweets. Sarcasm detection can help in gaining a better insight into customer sentiments. As incorporated into sarcasm modification module model 213 for sarcasm sentiment detection and sentiment intensity modification, features may be analyzed from tweets and their description in order to capture the sarcasm expressed in tweets, for example. Further in reading to online content postings including tweets, registered authors on have the opportunity to provide a personal profile or self-description. Such self-description or author profile data may be used to extract information about personality traits of content authors, to enable or help in classifying sarcastic tweets from non-sarcastic ones with a high degree of accuracy. IN one example embodiment, a range of different feature-sets from tweet-text in conjunction with author's self-description may be engineer using LinearSVM and Logistic Regression predictive models. Further, lexical-based features 307 of linguistic framework 301 may be generated from review text such as n-grams, intensifiers, number of capital letter words, binary feature for double quotes, emojis, and count of part-of-speech to name a few, as such features help in capturing the nuances of the writing style of a content author, such as Twitter users. Sentiment-based features may also be generated from the content. Positive, negative and difference in sentiment score, for example from different parts of the review text, are captured as features. This feature enables detection of a degree of contrast of sentiment that identifies or captures a likelihood of existence of sarcasm. Topic-modeling based features may be captured from the user profile description by applying the topic modeling technique. Such feature is based on the presumption that the author's self-description can give a better idea of an inclination towards sarcasm.

In an embodiment, a slang related sentiment may be detected and applied to modify, such as by amplifying or attenuating, the sentiment intensity rating upon detecting existence of a slang component of the set of keywords. To find slang sentiments, one or more slang lexicons, such as Urban Dictionary which is a web-based dictionary of slang definitions, lists of popular idioms, and SlangSD lexicon which contains slangs and their associated sentiments. If a slang term or component exists in the lexicon, the slang sentiment is collected, including collecting reviews containing the slang with high relevance score and the slang examples containing the slang from the slang lexicon source. In social media, slangs may be commonly used in short forms, and informal terms. Hence, slang polarity may be identified before sentiment classification of reviews or blogs and other content. Thus, slangs or idioms may be detected in reviews and other content, and a sentiment score assigned to each slang term. Such results may be aggregated based on a highest ranking to produce a unique sentiment score for each slang. Since slangs usage and definition may change over time and in different data sources, the data collection of slangs may be updated continuously.

Upon preprocessing the input content, steps applied to detect slangs in content may include a lookup table search in conjunction with the slang lexicon sources, then filtering out all non-slang words from text to find single-words slangs, such as by using WordNet and English words lexicons. Then, single words fond may be cross-referenced any existing definition in the slang lexicon source, upon which they are detected as slang, or otherwise simply a mis-spelling. Then upon slang detection, determining whether the slang appearing in the data content is consistent with its usage pattern in the lexicon source. In other words, if a slang in a review, for example, is consistent with its definition from Urban Dictionary as lexicon source. A relevancy score may be assigned to each content item containing the slang. In each content item that contains a slang, the slang is removed and compared to rest of the words in a text with the slang related words. This comparison is based on the semantic similarity between words in the content and words in the slang related words, for example, based on word2vec embeddings trained on Google News. If a word had a high semantic similarity to the related words, it may be added to a related words list. After comparing a review text with the slang related words, a list of floating numbers may be determined to represent a semantic distance between each pair of words. To assign the relevancy score to each data content item, the maximum semantic distance may be selected.

Methodology

FIG. 5 illustrates, in an example embodiment, method 500 of generating a transitory sentiment community, method 500 being performed by one or more processors 201 of server device 101. In describing the example of FIG. 5, reference is made to the examples of FIG. 1 through FIG. 4 for purposes of illustrating suitable components or elements in performing a step or sub-step being described.

Examples of method steps described herein relate to the use of server computing device 101 including transitory sentiment community logic module 105 for implementing the techniques described. According to one embodiment, the techniques are performed by server computing device 101 in response to the processor 201 executing one or more sequences of software logic instructions that constitute transitory sentiment community logic module 105. In embodiments, transitory sentiment community logic module 105 may include the one or more sequences of instructions within sub-modules including database module 210, data pre-processing module 211, sentiment analysis module 212, sarcasm modification module 213 and sentiment community generating module 214. Such instructions may be read into memory 202 from machine-readable medium, such as memory storage devices. In executing the sequences of instructions contained in database module 210, data pre-processing module 211, sentiment analysis module 212, sarcasm modification module 213 and sentiment community generating module 214 of transitory sentiment community logic module 105 in memory 202, processor 201 performs the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

Additionally, it is further contemplated that in alternative embodiments, the techniques herein, or portions thereof, may be distributed between client, or subscriber, computing devices 102a-c and server computing device 101. For example, computing devices 102a-c may perform some portion of functionality described herein with regard to various modules of which transitory sentiment community logic module 105 is comprised, and transmit data to server 101 that, in turn, performs at least some portion of the techniques described herein.

At step 510, processor 201 executes instructions in association with database module 210 to receive data in memory 202 or a database memory 103 associated with server computing device 101, the data being extracted from a plurality of data sources.

In some embodiments, the data sources comprise publicly available data constituted of such as, but not limited to, tweet content, instant messaging content, product review content, service review content, social media posting content, and website content.

At step 520, processor 201 executes instructions of data pre-processing module 211 to pre-process the data, based on at least one of text character removal and text character replacement, to provide pre-processed data that includes a set of keywords used in a descriptive manner.

At step 530, processor 201 executes instructions of sentiment analysis module 212 to perform a sentiment analysis on the set of keywords based at least in part upon a training model, the sentiment analysis identifying: (i) a conformance to at least one sentiment classification of a set of sentiment classifications recognized by the training model, and (ii) a sentiment intensity rating associated with the conformance to the at least one sentiment classification.

In an embodiment, the sentiment classification comprises a subset of the set of sentiment classifications as recognized by the training model.

In one variation, the method further includes identifying a plurality of topics based on the pre-processed data and selecting at least one topic based on a ranking of the plurality of topics.

A commonality or frequency of occurrence of some or all keywords forming the set may predominantly pertain to the selected topic in accordance with the ranking.

In another embodiment, the sarcasm sentiment is detected based at least in part on a personality trait of an author of the data from which the set of keywords is sourced or is traceable, and the pre-processing further comprises pre-processing data of the personality trait of the author, to detect a sarcasm sentiment likelihood factor. The sarcasm sentiment likelihood factor may be expressed, or quantified, as a statistical confidence level, in one embodiment.

At step 540, processor 201 executes instructions of sarcasm modification module 213 to modify the sentiment intensity rating associated with the at least one sentiment classification upon detecting a sarcasm sentiment parameter that is above a sarcasm sentiment likelihood threshold value.

In an embodiment, identifying the sentiment intensity rating includes determining a quantifiable statistical sentiment score associated with the sentiment classification, and the modifying includes either amplifying and attenuating the sentiment intensity rating of the sentiment classification.

The instructions of sarcasm modification module 213 may be further executable to modify or alter the sentiment classification to one or more alternate sentiment classifications recognized by the training model. In a further embodiment, altering the sentiment classification also includes replacing the sentiment classification with a generally contrary or opposite sentiment classification when sarcasm sentiment is detected above a certain threshold statistical confidence level. By way of illustration and examples, where the sentiment classification related to a product or services review as expressed is originally interpreted as "delighted", then a generally contrary or opposite sentiment classification applied in generating the sentiment community in lieu of "delighted" might be "disappointed"; or where the sentiment classification as expressed is originally interpreted as "satisfied", then a generally contrary or opposite sentiment classification applied in generating the sentiment community in lieu of "satisfied" might be "dissatisfied"; or where the sentiment classification as expressed is originally interpreted as "trust", a generally contrary or opposite sentiment classification applied in generating the sentiment community in lieu of "trust" might be "mistrust" or "distrust".

In an embodiment, the method further comprises modifying the sentiment intensity rating by either amplifying, or attenuating, the sentiment intensity rating upon detecting existence of a slang component of the set of keywords.

At step 550, processor 201 executes instructions of sentiment community generation module 214 to generate the transitory sentiment community based at least in part on the at least one sentiment classification and the modified sentiment intensity rating.

In one variation, generating the transitory sentiment community may be based on applying a sentiment intensity threshold to the modified sentiment intensity rating, whereupon the generating is initiated upon the sentiment intensity rating crossing above, or below in another embodiment, the modified sentiment intensity threshold.

In an embodiment, the sentiment classification comprises a subset of the set of sentiment classifications, and the method further comprises generating the transitory sentiment community based on a sentiment intensity threshold associated with respective ones of the subset of sentiment classifications.

In some variations, the transient sentiment community, including physical user interface representations thereof, may be generated by sentiment community generating module 114 in conjunction with client interface module 106 of client computing device 102 at a display interface or a user interface of client computing device 102.

FIG. 6 illustrates, in an example embodiment, an architecture of a server computing system 601 for initiating, concurrent with execution of a software application that generates a transitory sentiment community, an interface for the transitory sentiment community. Although not depicted in FIG. 6, it contemplated that in some embodiments, transitory sentiment community interface module 605 of server architecture 601 incorporates or subsumes the processor-executable instructions of which transitory sentiment community logic module 105 is constituted, including any or all of sub-modules database module 210, data pre-processing module 211, sentiment analysis module 212, sarcasm modification module 213 and sentiment community generating module 214.

Transitory sentiment community interface module 605 may be constituted of instructions executable in processor 201 of server computing device 101 and include portions or sub-modules including sentiment parameter specification module 610, sentiment task automaton module 611, concurrent execution monitoring module 612 and subscriber interface initiating module 613.

Sentiment parameter specification module 610, in one embodiment, includes instructions executable in processor 201 to receive, at a memory 202 of the server computing device 101, a specification identifying at least one sentiment parameter in association with the subscriber computing device, the at least one sentiment parameter being related to an expected result generated during execution of a transitory sentiment community generation software application in a processor of the server computing device 101.

Sentiment parameters 610*a* may include the various sentiment classifications as used to generate of the transitory sentiment community, for example as described in accordance with the example operations of FIG. 5.

Threshold Conditions 610*b* relate to threshold conditions and values to be applied to the sentiment parameters 610, including sentiment intensity values for quantifying or estimating the strength of the sentiment or emotion being expressed in the data content as pre-processed, in one embodiment. The threshold value or condition as set for a particular parameter may serve as a constraint, which once exceeded, triggers or initiates generating a sentiment community based on that particular sentiment. In some embodiments, certain sentiments or emotions may be agglomerated into a defined set, and a threshold value set for the agglomeration of that set of sentiments. For example, a "positive" set may be defined to be constitute or agglomerate emotions or sentiments such as "happy", "satisfied", "contented", while a "negative" set may be constituted of an agglomeration of sentiments such as "dissatisfied", "sarcastic", "disappointed".

Subscriber computing devices 610*c* may be pre-identified and specified as particular ones of client computing devices 102 selected, permitted or authorized to receive, view, and interact with results pertaining to execution of a transitory sentiment community generation software application in processor 201 of server computing device 101.

Sentiment task automaton module 611, in one embodiment, includes instructions executable in processor 201 to generate, by the processor during execution of the sentiment community generation software application, a sentiment parameter task automaton representative of the at least one sentiment parameter;

Concurrent execution monitoring module 612, in one embodiment, includes instructions executable in processor 201 to monitor, by the sentiment parameter task automaton, during concurrent execution with object code of the sentiment community software application in the processor, the expected result related to the at least one sentiment parameter;

Subscriber interface initiating module 613, in one embodiment, includes instructions executable in processor 201 to initiate, at the subscriber computing device 102, a subscriber interface that includes at least a notification of the at least one sentiment parameter in accordance with the monitoring during the concurrent execution. In an embodiment, the notification at subscriber computing device 102 is triggered by processor 201 of server device 101 when a pre-existing threshold value set for a sentiment parameter, or an agglomeration of a set of sentiment parameters, is exceeded.

FIG. 7 illustrates, in an example embodiment, a method of operation 700 for initiating, concurrent with execution of a software application that generates a transitory sentiment community, an interface for the transitory sentiment community. In describing the example of FIG. 7, reference is made to the examples of FIG. 1 through FIG. 6 for purposes of illustrating suitable components or elements in performing a step or sub-step being described.

Examples of method steps described herein relate to the use of server computing device 101 including transitory sentiment community logic module 105 and transitory sentiment community interface logic module 605 for implementing the techniques described. According to one embodiment, the techniques are performed by server computing device 101 in response to the processor 201 executing one or more sequences of software logic instructions that constitute transitory sentiment community logic module 105 and transitory sentiment community interface logic module 605, or any portions thereof. In embodiments, transitory sentiment community logic module 105 transitory sentiment community interface logic module 605 may include instructions may be read into memory 202 from machine-readable medium, such as memory storage devices, executable by processor 201 in performing the process steps described herein. In alternative implementations, at least some hard-wired circuitry may be used in place of, or in combination with, the software logic instructions to implement examples described herein. Thus, the examples described herein are not limited to any particular combination of hardware circuitry and software instructions.

Additionally, it is further contemplated that in alternative embodiments, the techniques herein, or portions thereof, may be distributed between client, or subscriber, computing devices 102*a-c* and server computing device 101. For example, computing devices 102*a-c* may perform some portion of functionality described herein with regard to various modules of which transitory sentiment community logic module 105 and transitory sentiment community interface logic module 605 are comprised, and transmit data to server 101 that, in turn, performs at least some portion of the techniques described herein.

At step 710, receiving, at a memory 202 of the server computing device 101, a specification identifying at least one sentiment parameter in association with the subscriber computing device, the at least one sentiment parameter being related to an expected result generated during execution of a transitory sentiment community generation software application in a processor 201 of the server computing device 101.

In an embodiment, the transitory sentiment community software application executes in the processor 201 based on input data content and pre-processing of data that pertains to at least one of a product review and a services review.

At step 720, generating, by the processor 201 during execution of the sentiment community generation software application, a sentiment parameter task automaton, also referred to herein a sentiment task automaton, representative of the at least one sentiment parameter.

At step 730, monitoring, by the sentiment parameter task automaton, during concurrent execution with object code of the transitory sentiment community software application in the processor 201, the expected result related to the at least one sentiment parameter.

In an embodiment, the sentiment task automaton is defined by script code that includes data identifying the subscriber computing device, the at least one expected sentiment parameter and at least one of a threshold value and a threshold condition of the at least one expected sentiment parameter.

In another embodiment, the monitoring comprises one or more application program interface (API) calls by the sentiment task automaton to the transitory sentiment community software application during the concurrent execution in processor 201 of server computing device 101.

At step 740, initiating, at the subscriber computing device 102, a subscriber interface that includes at least a notification of the at least one sentiment parameter in accordance with the monitoring during the concurrent execution.

The size, intensity of sentiment(s), and rate of growth or subsidence of the transitory sentiment community, in one embodiment, may be used as a proxy for deciding when to initiate the notification to a display interface of the subscriber computing device. In a related variation, the notification may be presented thereon in the context of at least one of a rate of growth, a rate of subsidence, and a benchmark size of a sentiment community generated during the concurrent execution. The benchmark size may be set as a threshold, and may be user-established, such as in accordance with users at the client subscriber devices 102 who are authorized to receive particular notifications, and optionally, charged with setting the threshold sizes applicable as a condition precedent to initiating the notifications. In another embodiment, the threshold conditions or benchmark values may be set dynamically, depending on the users' tendency and history of timely responses to notifications when based on certain sentiment communities.

In an embodiment, the initiating is based on the at least one expected sentiment parameter exceeding a constraint in accordance with the at least one of the threshold value and the threshold condition as set in accordance with threshold values 610b of sentiment parameter specification module 610.

In yet another embodiment, the display user interface at client subscriber device 102 solicits a user input action thereon for at least one of an approval, a dis-approval, an acknowledgement of the notification of the at least one sentiment parameter, a replacement and a modification of the threshold value and the threshold condition of the at least one expected sentiment parameter.

In a further embodiment, data of the user input action, when performed at the display user interface of client subscriber device 102 in response to the solicitation, is transmitted to a memory of the server computing device 101. Depending on which, if any, sentiment community attributes are of user concern or current user interest, in one embodiment the users' input at client subscriber device 102 in response to the notifications may update the threshold conditions 610b at sentiment parameter specification module 610, allowing subsequent notifications to be further customized to said user interest.

Figure 8:
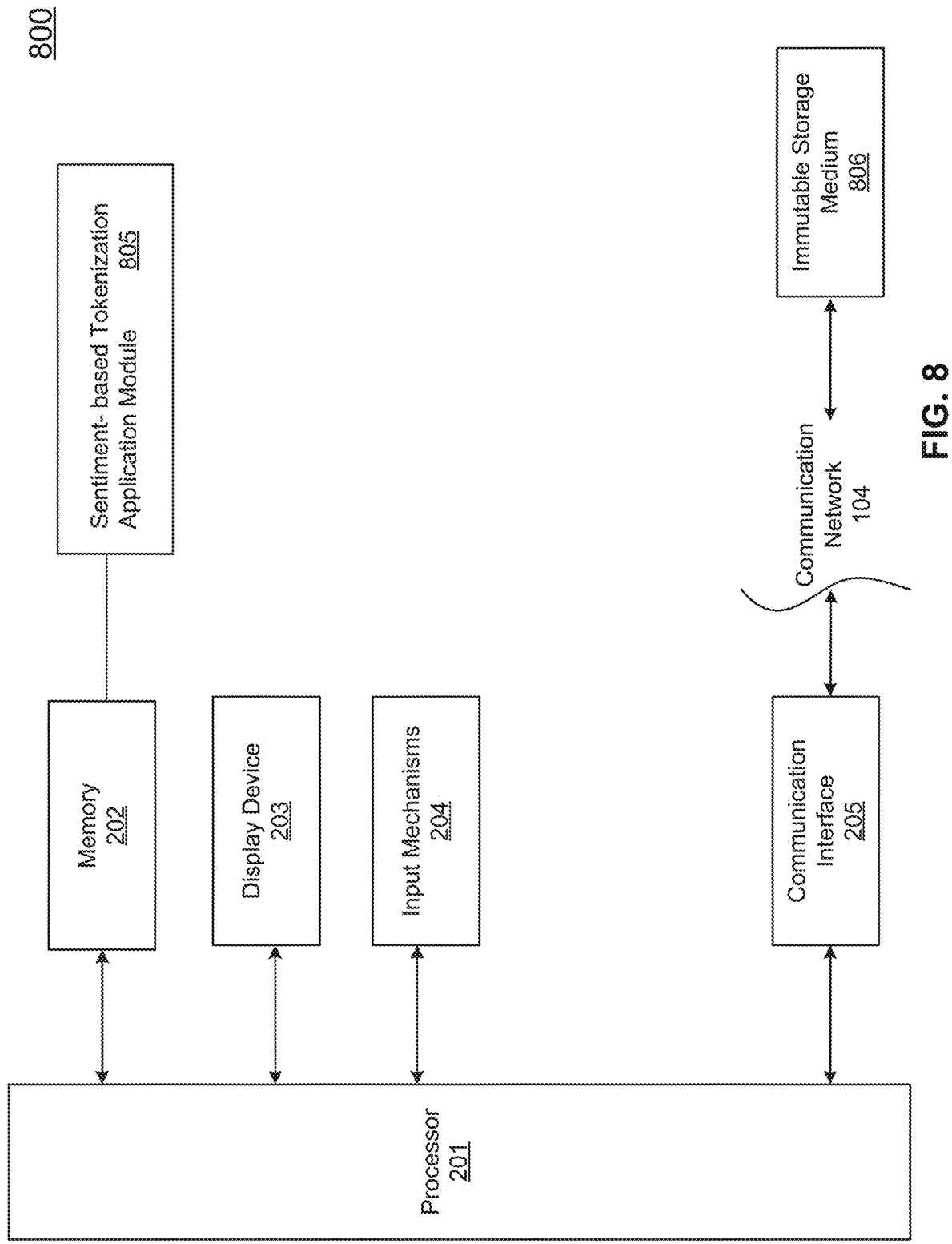
FIG. 8 illustrates, in an example embodiment, an architecture of a computing system for generating a sentiment-based digital asset.

FIG. 8 illustrates, in an example embodiment, architecture 800 of a computing system 101, 102 for generating a sentiment-based digital asset. Architecture 800 may be embodied in server computing device 101. In edge computing embodiments, architecture 800 may be embodied in subscriber client device 102. In either configuration, sentiment-based content as generated by a user of subscriber client device 102 may be captured thereon as created by the user, and processed in parts using techniques disclosed herein, by subscriber client device 102 in conjunction with server computing device 101, with computing system processor and memory resources being shared or dispersed variously amongst server computing device 101 and subscriber client device 102 for executing instructions constituting sentiment-based tokenization application 805. In embodiments of architecture 800, processor 201 is coupled to memory 202, display device 203, input mechanisms 204, and via communication interface 205, to immutable storage medium 806 via communication network 104.

As referred to herein, an immutable storage medium includes a subset of storage media characterized by the presumed difficulty, after the fact, of altering or deleting data stored therein. In other words, it is considered infeasible to alter data stored on such immutable media, without invalidating the data or the medium itself. Blockchain, newspapers and write once read many (WORM) storage media are commonly referenced members of this set.

An immutable storage medium makes use of public and private keys in order to form a digital signature to ensure security. With the property of immutability embedded in blockchain, as an illustrative, non-limiting example of an immutable storage medium, it becomes easier to detect tampering of any data. Blockchains are considered tamperproof as any unilateral change in even one single block can be detected. In advancing a transfer, the sender uses their private key and announces the transaction information over the network. In such an example immutable storage medium, a block, or blockchain node, is created containing information such as digital signature, timestamp, and the receiver's public key. Once the majority of nodes in the network come to a consensus and agree to a common solution, the block is time stamped and added to the existing blockchain. This block can contain data records as the subject of the transfer. After a new block is added to the chain, the existing copies of blockchain are updated for all the nodes on the network. Blockchains are decentralized in nature, with no single person or group having authority to unilaterally enact changes to data records once created. Hashes can be applied to detect tampering, so any change in the data record will lead to a detectible change in the hash. In embodiments, the immutable storage medium can comprise a private or a public blockchain, and a data record of the sentiment block digital asset can be accorded a unique identifier of a location within the immutable storage medium.

Figure 9:
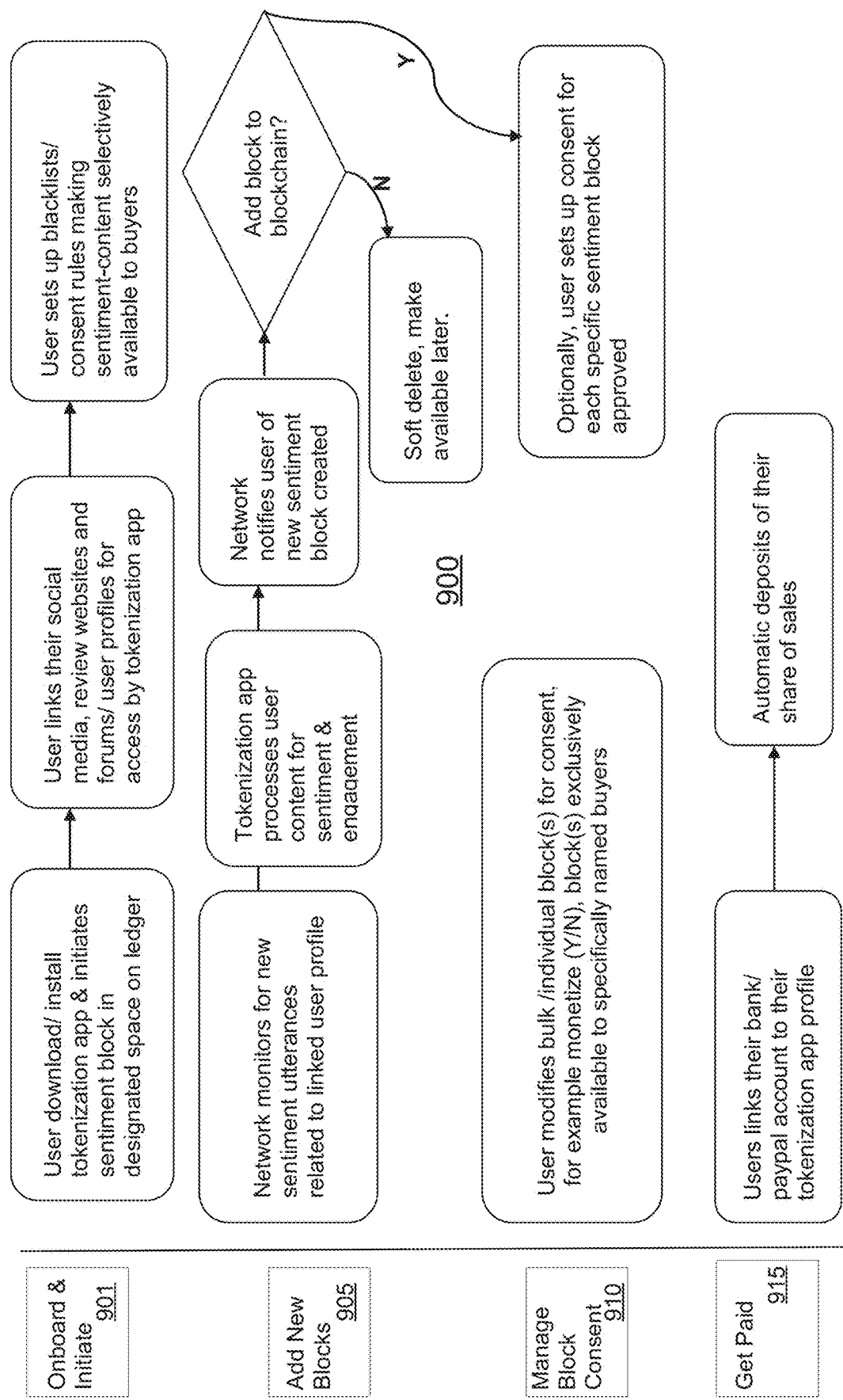
FIG. 9 illustrates, in an example embodiment, a scheme for generating and deploying a sentiment-based digital asset.

FIG. 9 illustrates an example embodiment 900, as pertains more specifically to sentiment-based tokenization application module 805 in some embodiments, for generating and deploying a sentiment-based digital asset.

At block 901, in an onboarding and application initiation process, a user of subscriber client device 102 downloads and installs sentiment-based tokenization application module 805 and initiates a sentiment block in a designated user space allocated on a blockchain ledger hosted on an immutable medium. In embodiments, a user as referred to herein means a content creator who creates sentiment-based content. Such sentiment-based created content and inherent intellectual property rights associated therewith may constitute basis for the sentiment block digital asset as referred to herein, and the benefit of the inherent intellectual property rights may inure to such user of a sentiment-based user engagement network system as described with regard to FIGS. 1-11 herein. In embodiments, the user links their created sentiment-based content such as (but not limited to) social media commentaries, review of websites, products and forum interactions based on their user profiles or accounts, for access by tokenization application 805. In embodiments, the user sets up consent rules for making their sentiment-content selectively available only to certain buyers or classes of buyers. The consent rules may include blacklists of buyers and certain classes of buyers who are prohibited from access and usage of a given user's created content.

At block 905, the network 100, for instance via server computing device 101, may monitor continuously for new sentiment utterances and content related to a given user profile or account. the user may add new sentiment blocks in accordance with new or modified content created. Tokenization application 805, in embodiments, processes the new user content for sentiment expressions. Server computing device 101 may notify the user of client subscriber device 102 of new sentiment blocks created and render a request for the user to decide whether to add the new sentiment block to an existing blockchain. In an embodiment, the user may decline the request, or defer the decision to a later date. Optionally, the user sets up consent attributes for each specific sentiment block approved. In certain edge computing embodiments, client subscriber device 102 may execute some of the actions described herein as being performed by server computing device 101.

At block 910, in managing consent rules related to a sentiment block, or a group of blocks, the user modifies bulk or individual blocks appropriately for consent, for example whether to monetize block(s) exclusively available to specifically named buyers.

At block 915, in actions associated with monetization of their sentiment based blocks now tokenized on the blockchain in embodiments, the user links their financial accounts, such as a bank account or a PayPal account, to their digital asset tokenization profile. In this manner, the user can be compensated via automatic monetary deposits by way of monetizing in selling their rights or licensing usage of their rights intellectual property associated with the sentiment blocks.

Figure 10:
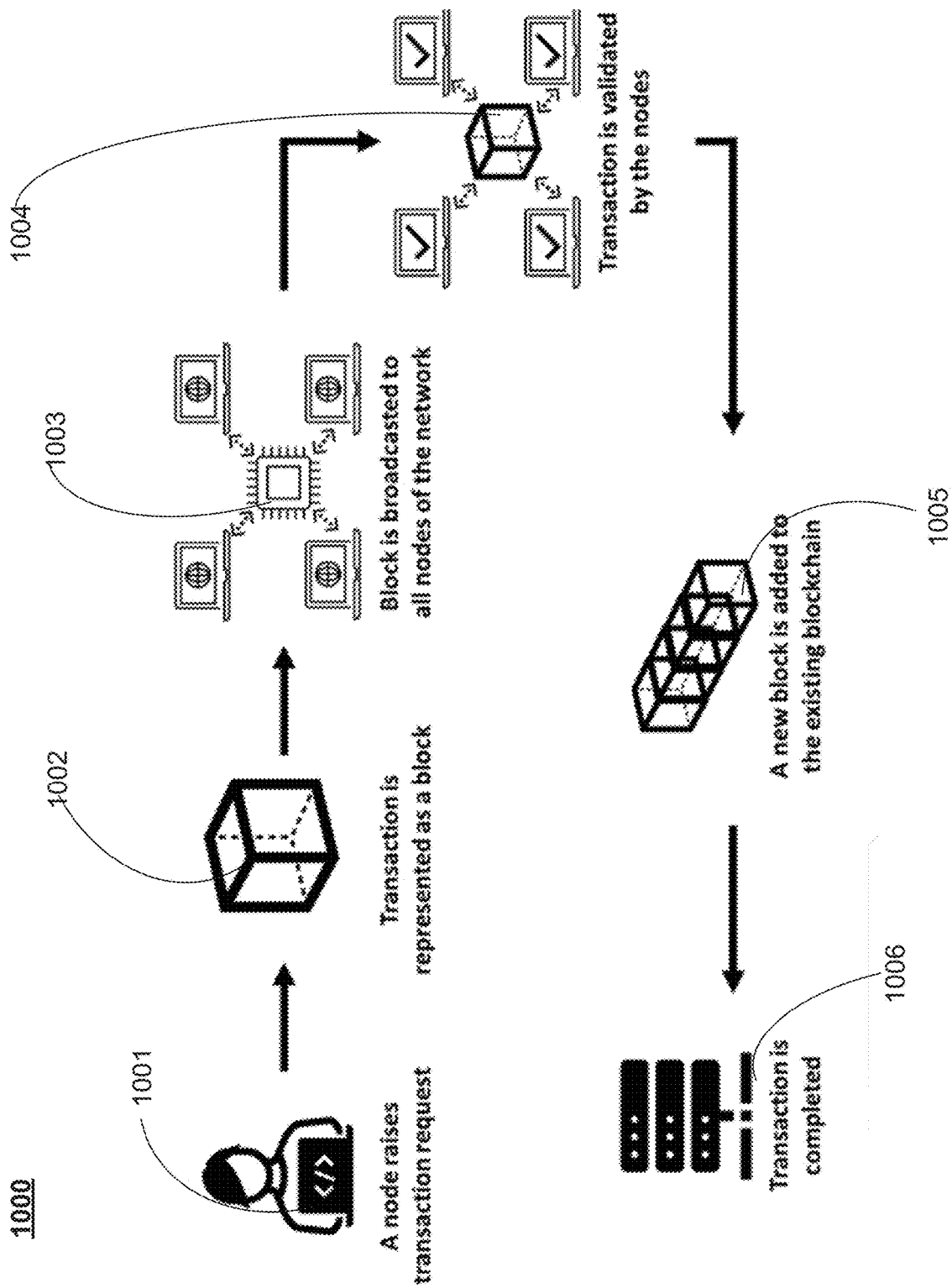
FIG. 10 illustrates, in an example embodiment, a method of operation in generating a tokenized digital asset in accordance with a sentiment-based digital asset.

FIG. 10 illustrates, in an example embodiment, a method of operation in generating a tokenized digital asset in accordance with a sentiment-based digital asset and deploying same within a blockchain system.

At 1001, a client subscriber node, such as client subscriber device 102 raises a sentiment block transaction request related to new sentiment content created or generated. At 1002, the transaction is represented as a digital token manifestation of the sentiment block, and at 1003 the digital token representing the sentiment block is broadcasted to all nodes of the blockchain network, then at 1004 is validated by the nodes. As used herein, a token means a digital representation of an interest in an asset that, in some embodiments herein, may be used to facilitate transactions on a blockchain. At 1005, a new block is added to the existing blockchain, forming an updated blockchain by way of completing the tokenization of the sentiment block by way of a completed transaction for the new sentiment content.

In embodiments, a sentiment block, or sentiment block digital asset as variously referred to herein, as configured may include attributes such as: sender's address: the address of the sender of the transaction, recipient address: the address of the recipient of the transaction, user metric: all metrics will be key/value pairs. key will be type (sentiment, engagement etc.) and value is calculated score for the type, key contexts: list of sentimental context phrases, channel: where did the interaction occur—facebook, instagram etc., username: the userid on the network, text: text string which captures or encodes the sentiment intensity, image/video: url of image related with the sentiment intensity, metric timestamp: timestamp when the metric was recorded, and block timestamp, a message record as to which block a given transaction was recorded in, as well as its timestamp. since the blockchain is public, anyone can see all transactions on it. therefore this information can be used to see when payments were made to content creators or wallets were funded for specific periods of time.

FIG. 11 illustrates, in an example embodiment, a method of operation in rendering a tokenized digital asset.

At step 1110, monitoring, at client subscriber device 102 that is communicatively coupled within communication network 104, generation of at least one sentiment expression in accordance with social media content data, the sentiment expression rendered in association with a sentiment community of interest within cloud networked system 100.

At step 1120, generating a sentiment block digital asset (also referred to herein as a "sentiment block") in accordance with the sentiment expression.

At step 1130, rendering, as a tokenized digital asset, a digital token data file that is a unique representation of the sentiment block digital asset. As used herein, a token means a digital representation of an interest in an asset that, in some embodiments herein, may be used to facilitate transactions on a blockchain. In some embodiments, associating the sentiment block with a given unique user account or user profile within network system 100 with particular data content attributes (such as, but not limited to, a date and time of the content creation by a given subscriber/user, an event, a product name, an entity or company name that the created content pertains to) may be sufficient to establish the unique representation or unique correspondence between the tokenized digital asset and a particular sentiment block.

In some examples, the social media content data comprises one or more of a hashtag, a twitter handle, an emoticon, a message exchange, at least one of an audio and a visual content portion, at least a portion of a website content, a product name, a product feature, a third-party character or entity name, and a third-party character or entity attribute.

In some embodiments, the sentiment block digital asset comprises one or more of an image, a video, a text portion, a website content portion, an audio rendering, and a text string produced via a speech to text conversion of at least a portion of the audio rendering.

In some embodiments, the sentiment block digital asset includes a user account, a set of consent rules, one of a pointer and a link to a designated storage space within an immutable storage medium, an associated monetary value and a link to one or more financial payment accounts associated with the user account. In some aspects, the set of consent rules may restrict one or both of access and usage to a restricted class of potential third party buyers of content of the sentiment block digital asset. Yet further, the set of consent rules may restrict a context of usage and/or a type of usage pertaining to the sentiment block digital asset.

In some embodiments, the method further includes rendering a confirmation, at a display interface of a client subscriber device 102, of the tokenized digital asset and soliciting a decision to transmit the tokenized digital asset to the designated storage space within the immutable storage medium. In embodiments, the immutable storage medium comprises a blockchain configuration.

In some embodiments, the sentiment expression comprises a sarcasm sentiment, and the method further includes modifying, responsive to detecting the sarcasm sentiment as being one of above and below a sarcasm sentiment likelihood threshold, a sentiment classification associated with the at least one sentiment expression.

It is contemplated that embodiments described herein extend to individual elements and concepts described herein, independently of other concepts, ideas or system, as well as for embodiments to include combinations of elements recited anywhere in this application. Although embodiments are described in detail herein with reference to the accompanying drawings, it is to be understood that the invention is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments as described herein.

Thus, the absence of describing combinations should not preclude the inventors from claiming rights to such combinations.

What is claimed is:

1. A method, performed in a processor of a computing device, of valuing a digital asset, the method comprising:
    monitoring generation of at least one sentiment expression in accordance with social media content data, the at least one sentiment expression rendered in association with a sentiment community of interest and having an associated sentiment classification;
    generating a sentiment block digital asset in accordance with the at least one sentiment expression;
    upon detecting that the sentiment classification for the at least one sentiment expression comprises a sarcasm sentiment, replacing the sentiment classification for the at least one sentiment expression with an opposite sentiment classification; and
    rendering, as a tokenized digital asset, a digital token data file that is a unique representation of the sentiment block digital asset based at least in part on the opposite sentiment classification.

2. The method of claim 1 wherein the social media content data comprises one or more of: a hashtag, a twitter handle, an emoticon, a message exchange, at least one of an audio and a visual content portion, at least a portion of a website content, a product name, a product feature, a third-party character name, and a third-party character attribute.

3. The method of claim 1 wherein the sentiment block digital asset comprises at least one of: an image, a video, a text portion, a website content portion, an audio rendering, and a text string produced via a speech to text conversion of at least a portion of the audio rendering.

4. The method of claim 3 wherein the sentiment block digital asset further comprises at least one of: a user account, a set of consent rules, one of a pointer and a link to a designated storage space within an immutable storage medium, an associated monetary value and a link to one or more financial payment accounts associated with the user account.

5. The method of claim 4 wherein the set of consent rules restrict at least one of access and usage to a restricted class of potential third party buyers of content in accordance with the sentiment block digital asset.

6. The method of claim 4 wherein the set of consent rules restrict at least one of a context of usage and a type of usage pertaining to the sentiment block digital asset.

7. The method of claim 1 further comprising:
    rendering a confirmation, at a display interface of a client subscriber device, of the tokenized digital asset; and
    soliciting a decision to transmit the tokenized digital asset to the designated storage space within the immutable storage medium.

8. The method of claim 7 wherein the immutable storage medium comprises a blockchain configuration.

9. The method of claim 1 wherein detecting that the sentiment classification for the at least one sentiment expression comprises a sarcasm sentiment comprises detecting a sarcasm sentiment intensity parameter as being above a sarcasm sentiment likelihood threshold value.

10. The method of claim 9 further comprising modifying, responsive to detecting the sarcasm sentiment as being one of above and below a sarcasm sentiment likelihood threshold, a sentiment classification associated with the at least one sentiment expression.

11. The computing system of claim 1 wherein that the sentiment classification for the at least one sentiment expression comprises a sarcasm sentiment comprises detecting a sarcasm sentiment intensity parameter as being above a sarcasm sentiment likelihood threshold value.

12. A computing system comprising:
    a processor;
    a memory storing a set of instructions, the instructions when executed in the processor causing operations comprising:
        monitoring generation of at least one sentiment expression in accordance with social media content data, the at least one sentiment expression rendered in association with a sentiment community of interest and having an associated sentiment classification;
        generating a sentiment block digital asset in accordance with the at least one sentiment expression;
        upon detecting that the sentiment classification for the at least one sentiment expression comprises a sarcasm sentiment, replacing the sentiment classification for the at least one sentiment expression with an opposite sentiment classification; and
        rendering, as a tokenized digital asset, a digital token data file that is a unique representation of the sentiment block digital asset based at least in part upon the opposite sentiment classification.

13. The computing system of claim 12 wherein the social media content data comprises one or more of: a hashtag, a twitter handle, an emoticon, a message exchange, at least one of an audio and a visual content portion, at least a portion of a website content, a product name, a product feature, a third-party character name, and a third-party character attribute.

14. The computing system of claim 12 wherein the sentiment block digital asset comprises at least one of: an image, a video, a text portion, a website content portion, an audio rendering, and a text string produced via a speech to text conversion of at least a portion of the audio rendering.

15. The computing system of claim 14 wherein the sentiment block digital asset further comprises at least one of: a user account, a set of consent rules, one of a pointer and a link to a designated storage space within an immutable storage medium, an associated monetary value and a link to one or more financial payment accounts associated with the user account.

16. The computing system of claim 15 wherein the set of consent rules restrict at least one of access and usage to a restricted class of potential third party buyers of content in accordance with the sentiment block digital asset.

17. The computing system of claim 15 wherein the set of consent rules restrict at least one of a context of usage and a type of usage pertaining to the sentiment block digital asset.

18. The computing system of claim 12 further comprising instructions executable in the processor to perform operations including:
    rendering a confirmation, at a display interface of a client subscriber device, of the tokenized digital asset; and
    soliciting a decision to transmit the tokenized digital asset to the designated storage space within the immutable storage medium.

19. The computing system of claim 18 wherein the immutable storage medium comprises a blockchain configuration.

20. A non-transitory, computer readable medium storing instructions, the instructions being executable in a processor, the instructions when executed in the processor causing operations comprising:

monitoring generation of at least one sentiment expression in accordance with social media content data, the at least one sentiment expression rendered in association with a sentiment community of interest and having an associated sentiment classification;

generating a sentiment block digital asset in accordance with the at least one sentiment expression;

upon detecting that the sentiment classification for the at least one sentiment expression comprises a sarcasm sentiment, replacing the sentiment classification for the at least one sentiment expression with an opposite sentiment classification; and rendering, as a tokenized digital asset, a digital token data file that is a unique representation of the sentiment block digital asset based at least in part on the opposite sentiment classification.

\* \* \* \* \*